(12) United States Patent
Olofsson et al.

(10) Patent No.: US 9,792,701 B2
(45) Date of Patent: Oct. 17, 2017

(54) METHOD AND SYSTEM FOR DETERMINING A RELATION BETWEEN A FIRST SCENE AND A SECOND SCENE

(75) Inventors: Michael Olofsson, Vaexjoe (SE); Folke Isaksson, Linkoeping (SE); Magnus Brege, Linkoeping (SE); Ingmar Andersson, Linkoeping (SE); Per Carlbom, Linkoeping (SE); Johan Borg, Linkoeping (SE); Leif Haglund, Brokind (SE); Fredrik Rosenqvist, Linkoeping (SE)

(73) Assignee: SAAB AB, Linkoeping (SE)

( * ) Notice: Subject to any disclaimer, the term of this patent is extended or adjusted under 35 U.S.C. 154(b) by 0 days.

(21) Appl. No.: 14/355,144

(22) PCT Filed: Nov. 8, 2011

(86) PCT No.: PCT/SE2011/051338
§ 371 (c)(1),
(2), (4) Date: Jul. 17, 2014

(87) PCT Pub. No.: WO2013/070125
PCT Pub. Date: May 16, 2013

(65) Prior Publication Data
US 2015/0078652 A1    Mar. 19, 2015

(51) Int. Cl.
*G06T 17/05* (2011.01)
*G06K 9/00* (2006.01)
(Continued)

(52) U.S. Cl.
CPC ............... *G06T 7/75* (2017.01); *G01C 11/06* (2013.01); *G06K 9/00208* (2013.01);
(Continued)

(58) Field of Classification Search
None
See application file for complete search history.

(56) References Cited

U.S. PATENT DOCUMENTS 5,173,949 A    12/1992 Peregrim et al.
7,443,154 B1 *  10/2008 Merewether ........... G01V 3/104
324/326

(Continued)

OTHER PUBLICATIONS

Mourad Bouziani, Kalifa Goïta, Dong-Chen He, Automatic change detection of buildings in urban environment from very high spatial resolution images using existing geodatabase and prior knowledge, ISPRS Journal of Photogrammetry and Remote Sensing, vol. 65, Issue 1, Jan. 2010, pp. 143-153, ISSN 0924-2716.*

(Continued)

*Primary Examiner* — Kim Vu
*Assistant Examiner* — Nathan Bloom
(74) *Attorney, Agent, or Firm* — Alston & Bird LLP

(57) ABSTRACT

The present invention relates to a system (200) and method for determining a relation between a first scene and a second scene. The method comprises the steps of generating at least one sensor image of a first scene with at least one sensor; accessing information related to at least one second scene, said second scene encompassing said first scene, and matching the sensor image with the second scene to map the sensor image onto the second scene. The step of accessing information related to the at least one second scene comprises accessing a 3D map comprising geocoded 3D coordinate data. The mapping involves associating geocoding information to a plurality of positions in the sensor image based on the coordinate data of the second scene.

33 Claims, 3 Drawing Sheets

(51) Int. Cl.
    *G06T 3/00*     (2006.01)
    *G01C 11/06*     (2006.01)
    *G06T 7/73*     (2017.01)
    *G06T 7/33*     (2017.01)

(52) U.S. Cl.
    CPC ........ *G06K 9/00624* (2013.01); *G06T 3/0068* (2013.01); *G06T 7/337* (2017.01); *G06T 17/05* (2013.01); *G06T 2207/10032* (2013.01); *G06T 2207/30181* (2013.01); *G06T 2207/30244* (2013.01)

(56) References Cited

U.S. PATENT DOCUMENTS

| | | | | |
|---|---|---|---|---|
| 8,036,678 | B2* | 10/2011 | Goldenberg | G06F 17/3087 345/165 |
| 8,260,006 | B1* | 9/2012 | Callari | G06K 9/00973 345/619 |
| 2001/0038718 | A1* | 11/2001 | Kumar | G06T 3/0081 382/284 |
| 2003/0085890 | A1* | 5/2003 | Baumberg | G06T 15/04 345/420 |
| 2003/0187819 | A1 | 10/2003 | Gutierrez et al. | |
| 2003/0218675 | A1 | 11/2003 | Nonoyama | |
| 2003/0225513 | A1* | 12/2003 | Gagvani | G06T 17/05 701/431 |
| 2005/0220363 | A1* | 10/2005 | Oldroyd | 382/294 |
| 2006/0239537 | A1* | 10/2006 | Shragai et al. | 382/154 |
| 2007/0058885 | A1 | 3/2007 | Leib et al. | |
| 2007/0127101 | A1 | 6/2007 | Oldroyd | |
| 2007/0162194 | A1* | 7/2007 | Garceau | G06T 5/50 701/3 |
| 2008/0131029 | A1* | 6/2008 | Coleby et al. | 382/300 |
| 2008/0140271 | A1* | 6/2008 | Garceau | G06T 7/001 701/10 |
| 2009/0067725 | A1* | 3/2009 | Sasakawa et al. | 382/190 |
| 2009/0115779 | A1* | 5/2009 | Shulman | G01B 11/2513 345/419 |
| 2009/0132469 | A1 | 5/2009 | White et al. | |
| 2009/0141966 | A1* | 6/2009 | Chen | G06T 19/006 382/154 |
| 2010/0100540 | A1* | 4/2010 | Davis | G06K 9/0063 707/728 |
| 2010/0142748 | A1* | 6/2010 | Oldroyd | 382/100 |
| 2012/0218409 | A1* | 8/2012 | Pritt | G01C 11/06 348/144 |
| 2012/0243775 | A1* | 9/2012 | Ma | G06T 7/0075 382/154 |
| 2012/0263373 | A1* | 10/2012 | Walter et al. | 382/154 |
| 2015/0213590 | A1* | 7/2015 | Brown | G06T 17/05 345/419 |

OTHER PUBLICATIONS

Matikainen, Leena, et al. "Automatic detection of buildings and changes in buildings for updating of maps." Remote Sensing 2.5 (2010): 1217-1248.*

Nicolas Champion, Didier Boldo, Marc Pierrot-Deseilligny, Georges Stamon, 2D building change detection from high resolution satelliteimagery: A two-step hierarchical method based on 3D invariant primitives, Pattern Recognition Letters, vol. 31, Issue 10, Jul. 15, 2010, pp. 1138-1147, ISSN 0167-8655.*

Hassan, Taher, and Naser El-Sheimy. "Common adjustment of land-based and airborne mobile mapping system data." Int. Arch. Photogramm. Remote Sens. Spatial Inf. Sci 37 (2008): 835-842.*

International Searching Authority, International Search Report and Written Opinion for International Application No. PCT/SE2011/051338, dated Jul. 24, 2012, 10 pages, Swedish Patent and Registration Office, Sweden.

* cited by examiner

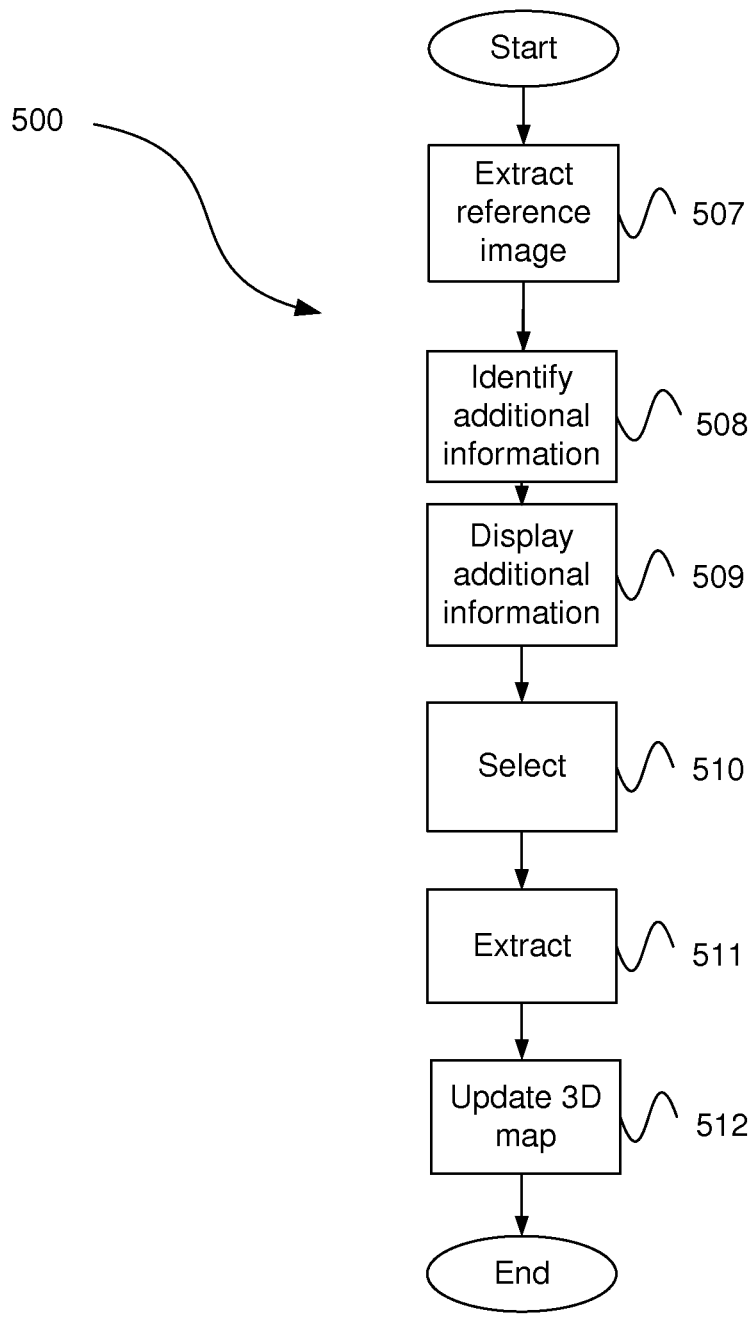

METHOD AND SYSTEM FOR DETERMINING A RELATION BETWEEN A FIRST SCENE AND A SECOND SCENE

CROSS REFERENCE TO RELATED APPLICATIONS

This application is a National Stage Application, filed under 35 U.S.C. §371, of International Application No. PCT/SE2011/051338, filed Nov. 8, 2011; the contents of which is hereby incorporated by reference in its entirety.

BACKGROUND

Related Field

The present invention relates to a method and system for determining a relation between a first scene and a second scene.

Description of Related Art

US 2003/0218675 describes a video picture processing method intending to take a shot of a ground surface from a video camera mounted on an airframe in the air and identify situations existing on the ground surface. The method comprises the steps of specifying three-dimensionally a photographic position in the air, computing a photographic range of the ground surface having been shot; transforming a video picture in conformity with the photographic range; and displaying the transformed picture in such a manner as being superimposed on a map of a geographic information system.

BRIEF SUMMARY

One object of the present invention is to provide improved geopositioning of an image.

This has in accordance with one example been achieved by means of a method for determining a relation between a first scene and a second scene. The method comprises the steps of generating at least one sensor image of a first scene with at least one sensor; accessing information related to at least one second scene, said second scene encompassing said first scene, and matching the sensor image with the second scene to map the sensor image onto the second scene. The step of accessing information related to the at least one second scene comprises accessing a 3D map comprising geocoded 3D coordinate data. The mapping involves associating geocoding information to a plurality of positions in the sensor image based on the coordinate data of the second scene.

Thereby, the sensor is associated to geocoding information in conformity with the coordinate system of the geocoded 3D coordinate data of the 3D map.

In one option, the 3D map comprises a 3D model of the environment comprising 3D coordinate data given in a geo-referenced coordinate system. The model may reflect the reality seen from any angle.

In one option, the 3D model is textured. In one option, at least some of the 3D coordinate data is associated to texture information.

In one option, the method further comprises a step of extracting coordinate information related to a selected point or area in the sensor image. Thus, the coordinates of an interesting point or area can be extracted in the coordinate system of the 3D map.

In one option, the method further comprises a step of displaying the sensor image on a display. The interesting point or area may then be selected based on the display image.

In one option, the method further comprises a step of forming a geocoded reference image from the second scene, wherein the geographical extension of the geocoded reference image corresponds to the geographical extension of the sensor image. Information in the two images can then be compared.

In one option, the method comprises a step of identifying geocoded additional information from the geocoded sensor image in relation to the corresponding geocoded reference image. The geocoded additional information may comprise information relating to addition and/or removal of at least one object in the sensor image in relation to the corresponding geocoded reference image. The geocoded additional information may comprise information related to a difference in shape and/or size of at least one object in the sensor image in relation to the corresponding geocoded reference image. The additional information may comprise information relating to at least one texture deviation in the sensor image in relation to the corresponding geocoded reference image. The additional information may comprise additional geocoded coordinate data providing enhanced resolution in relation to the reference image.

In one option, the at least one sensor is arranged to measure sensitivity in another wavelength than within the visual field, e.g. Infrared (IR). The at least one sensor may then comprise an IR sensor. The geocoded additional information may then comprise for example IR data.

In one option, the method comprises a step of updating the geocoded reference image based on the additional information.

In one option, the method comprises a step of presenting the geocoded additional information.

In accordance with one example, the invention comprises a system for determining a relation between a first scene and a second scene. The system comprises at least one sensor arranged to capture at least one image of the first scene; a map comprising geographic information; a processing and control module arranged to access from the map information related to at least one second scene, said second scene encompassing said sensor image, and matching the sensor image with the second scene to map the sensor image onto the second scene. The map comprises geocoded 3D coordinate data and in that the processing and control module is arranged to associate geocoding information to a plurality of positions in the sensor image based on the coordinate data of the second scene.

In one option, the 3D map comprises a 3D model of the environment comprising 3D coordinate data given in a geo-referenced coordinate system. The 3D model may be textured. The system may further comprise means for extracting coordinate information related to a selected point in the sensor image.

In one option, the system further comprises a display arranged to display the sensor image and selection means for selecting the point from the displayed sensor image.

In one option, the processing and control module is arranged to form a geocoded reference image from the second scene, wherein the geographical extension of the geocoded reference image corresponds to the geographical extension of the sensor image. The processing and control module may then be arranged to identify geocoded additional information from the geocoded sensor image in relation to the corresponding geocoded reference image.

The geocoded additional information may comprise information relating to addition and/or removal of at least one object in the sensor image in relation to the corresponding geocoded reference image. The geocoded additional information may comprise information related to a difference in shape and/or size of at least one object in the sensor image in relation to the corresponding geocoded reference image. The additional information may comprise information relating to at least one texture deviation in the sensor image in relation to the corresponding geocoded reference image. The additional information may comprise additional geocoded coordinate data providing enhanced accuracy in relation to the reference image.

In one option, the at least one sensor comprises an IR sensor. The processing and control module may then be arranged to providing IR data as geocoded additional information.

In one option, the 3D map is updated with the additional information based on the geocoded reference image based on the additional information.

In one option, the system further comprises a further a presentation unit arranged to present information related to the sensor image associated with geocoding information. The presentation unit may further be arranged to present information related to the geocoded reference image. The presentation unit may be arranged to present information related to the geocoded additional information.

In one option, the system comprises a first platform comprising at least the at least one sensor and a first communication unit for transmittal of at least first data related to the captured at least one image of a first scene, and a second platform comprising at least the presentation unit and a second communication unit for reception of at least second data related to the sensor image associated with geocoding information.

The present invention also relates to a computer programme comprising a programme code for determining a relation between a first scene and a second scene. The computer programme comprises the steps of receiving first data related to at least one sensor image of a first scene from at least one sensor, receiving information related to at least one second scene, said second scene encompassing said first scene. This step comprises accessing a 3D map comprising geocoded 3D coordinate, and matching the sensor image with the second scene to map the sensor image onto the second scene. This step involves associating geocoding information to a plurality of positions in the sensor image based on the coordinate data of the second scene.

The present invention further relates to a computer programme product comprising a programme code stored on a, by a computer readable, media for determining a relation between a first scene and a second scene. The computer programme comprises the steps of receiving first data related to at least one sensor image of a first scene from at least one sensor, receiving information related to at least one second scene, said second scene encompassing said first scene, and matching the sensor image with the second scene to map the sensor image onto the second scene, wherein the step of receiving information related to the at least one second scene comprises accessing a 3D map comprising geocoded 3D coordinate data and the mapping involves associating geocoding information to a plurality of positions in the sensor image based on the coordinate data of the second scene, when said computer programme is run on a computer.

BRIEF DESCRIPTION OF THE FIGURES

FIG. 5 is a flowchart illustrating an example of a method for determining a relation between a geo-referenced sensor image and map data.

DETAILED DESCRIPTION OF VARIOUS EMBODIMENTS

Figure 1:
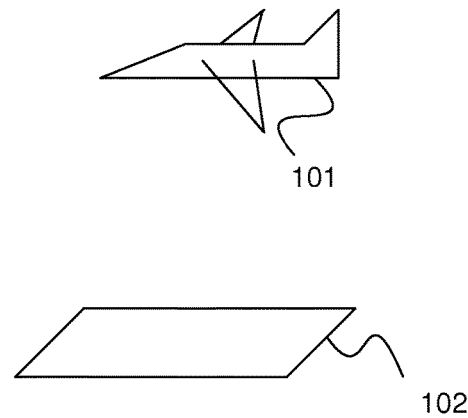
FIG. 1 illustrates schematically a first moving platform.

In FIG. 1, an object forming a first platform 101 is moving in a terrain. In the illustrated example, the object is an aerial object. The aerial object is for example a manned aerial vehicle or an unmanned aerial vehicle. The aerial vehicle may be a helicopter, an aircraft or the like. The object may also be for example land based.

The first platform 101 comprises a sensor scanning a terrain within the field of view of the sensor. Thus the sensor is arranged to capture images of a first scene 102. In one example the sensor is arranged to continuously capture images of the first scene as the aerial object is moving. The sensor may then be a video camera. The sensor may in an alternative example be arranged to capture images of the scene at preset time intervals or in a single shot.

The sensor images can then be processed so as to associate geocoded information to coordinate data of the sensor image. The processing involves matching the sensor image of the first scene 102 with geocoded 3D map coordinate data.

Figure 2:
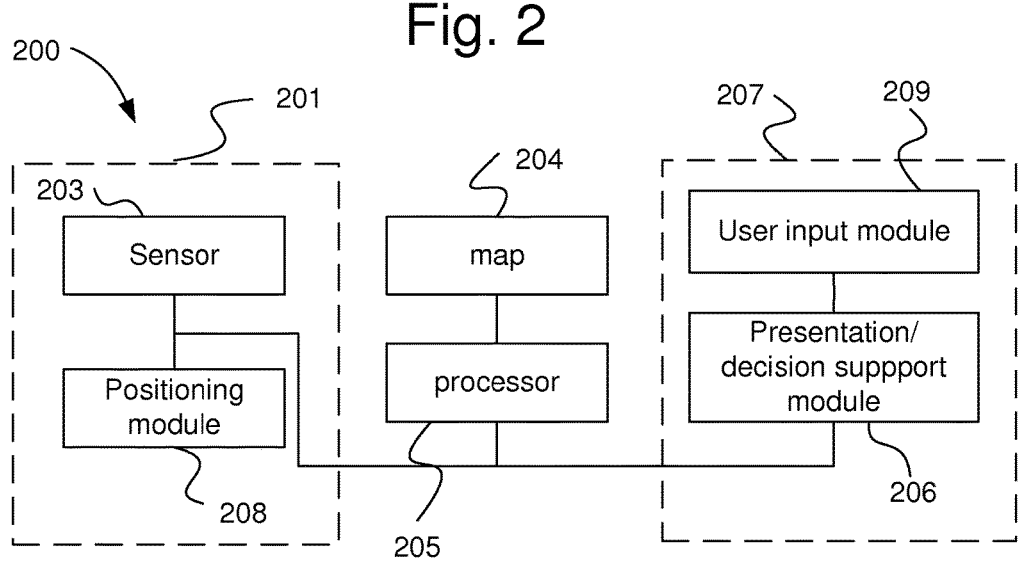
FIG. 2 is a block scheme illustrating an example of a system for determining a relation between a first scene and a second scene.

In FIG. 2, a system 200 comprises a first platform 201 and a second platform 207. The first platform comprises one or a plurality of sensors 203. The sensor may be a camera or a video camera operating in the visual field. Alternatively, or in addition the first platform may comprise a sensor operating in the IR field.

The first platform 201 may also comprise a positioning module 208. The positioning module may comprise equipment for determining the position of the first platform 201 in a geo-referenced coordinate system. The equipment for determining the position of the first platform 201 comprises for example a GPS receiver. The positioning module 208 may also comprise equipment for determining a pointing direction of the sensor(s) 203. Determining the pointing direction of a sensor is well known in the art and may be based on information from for example accelerometers and/or gyros.

A processing and control module 205 is arranged to receive information from the positioning module related to the position of the first platform and pointing direction of the sensor(s) onboard the platform. The processing and control module 205 further has access to a map 204.

The map 204 is a 3D map comprising 3D coordinate data given in a geo-referenced coordinate system. The 3D map may further be textured. The 3D map comprises a 3D model of the surrounding environment. The 3D model may comprise substantially all visible surfaces (above a certain size) in the surrounding seen from any angle. Thus, substantially all surfaces in the surrounding exceeding a certain size are associated to 3D coordinate data given in the geo-referenced coordinate system. Further, also texture data may be associated to all surfaces in the surrounding exceeding a certain size. The geo-referenced coordinate data may comprise latitude data, longitude data and height data and may be associated to texture information. The data may have an accuracy of one or a few meters, preferably in the range of decimeters. In one example, the resolution is one decimeter or lower.

The processing and control module 205 is arranged to extract from the map 204 3D model data related to a second scene based on the position and pointing direction information. The second scene is selected such that it is ensured that it encompasses the first scene. Thus, the size of the second scene is selected based on the accuracy of the position and direction data. The control and processing module is arranged to perform processing of the sensor image and the 3D model data related to the second scene. The processing involves matching the sensor image with the 3D model data related to a second scene to map the sensor image onto the 3D model data related to the second scene. The matching involves for example matching of texture information. A 3D model of the first scene may be formed based on the sensor images. It is known in the art to build a 3D model of a scene based on a plurality of images forming "stereo pairs". The 3D model of first the scene can then be used in matching the sensor image with 3D map. Thus, the 3D model of the first the scene can be matched with the data of the 3D map. The section of the 3D model data related to the second scene is hereinafter related to as a geocoded reference image. The mapping may involve associating geocoded information from the reference image to coordinate data of the sensor image.

The processing and control module 205 may further be arranged to identify geocoded additional information from the sensor image in relation to the corresponding geocoded reference image. The geocoded additional information may comprise information relating to addition and/or removal of at least one object in the sensor image in relation to the corresponding geocoded reference image. The geocoded additional information comprises information related to a difference in shape and/or size of at least one object in the sensor image in relation to the corresponding geocoded reference image. The additional information may comprise information relating to at least one texture deviation in the sensor image in relation to the corresponding geocoded reference image. The additional information may comprise additional geocoded coordinate data providing enhanced resolution in relation to the reference image. Further, the additional information may comprise IR data.

The processing and control module 205 may be arranged to perform processing so as to identify the additional information in numerous ways. In one example, the processing is performed based on texture deviations between the sensor image and the corresponding reference image. In this example, the processing can be performed based on a comparison between each single sensor image and the reference image. Based on this comparison, it can for example be identified addition and/or removal of objects. Further, a stereo processing module (not shown) may be present arranged to perform stereo processing based on consecutive sensor images. A 3D model of the first scene may then be formed based on the sensor images as discussed above. The 3D model of the first scene can then be used for matching the sensor image with the 3D map. Based on the 3D model of the first scene, additional information related to the sensor image can be provided such as the above mentioned geocoded coordinate data providing enhanced resolution in relation to the reference image, and also more accurate detection of addition/removal of objects and differences in shape and/or size of objects.

The processing and control module 205 may be arranged to provide updating information to the map 204 so as to update the 3D model based on the additional information in the sensor image. The additional information may be for example coordinate and/or texture data having a higher resolution than the present data of the map 204. Further, the additional information may be related to changes in the surrounding since the data of the map 204 was created.

The processing and control module 205 may be implemented in the first platform 201. However, it can also be implemented in the second platform 207 or in a third location (not shown) in communication with the first platform 201 and the second platform 207. Alternatively, different parts of the processing and control module 205 may be formed on different platforms/locations. The map 204 may be stored as a whole or in part in the first platform 201, the second platform 207 and/or the third location (not shown).

The second platform 207 may comprise a presentation and/or decision support module 206 and a user input module 209. In one example, the presentation and/or decision support module comprises a display arranged to display the sensor image. The user input module 209 may then comprise for example a computer mouse or a touch screen on the display for marking a position or area in the displayed sensor image. The display and/or decision support module 206 is then arranged to extract coordinate information from the sensor image related to the selected position/area. This coordinate information may then be used by other systems.

In one example, wherein there exists additional information related to the comparison between the geo referenced reference image and the sensor image, the presentation and/or decision support module 206 may be arranged to display said additional information. In one example, the display is arranged to display the sensor image with the additional information marked in the sensor image. In one example, the additional information is marked as frames enclosing areas wherein additional information has been identified. The type of additional information which has been identified can also be presented on the display (for example, removed object, a hot spot, etc). This information may then be used for example as decision support for example when deciding about if the second platform 207 shall enter area scanned by the sensor. The display may then be arranged to display information related to a plurality of sensor images covering a wider geographical area. The user input module 209 may then, as described above, be used for marking an arbitrary position or area in the displayed sensor image and/or a position or area associated to additional information. The display and/or decision support module 206 is then arranged to extract coordinate information from the sensor image related to the selected position/area. In one example, the display is arranged to display the sensor image in a map, wherein the map 204 can be used for providing data to the displayed map surrounding the sensor image. The displayed sensor image may be continuously updated as the first platform moves or the sensor is turned.

Figure 3:
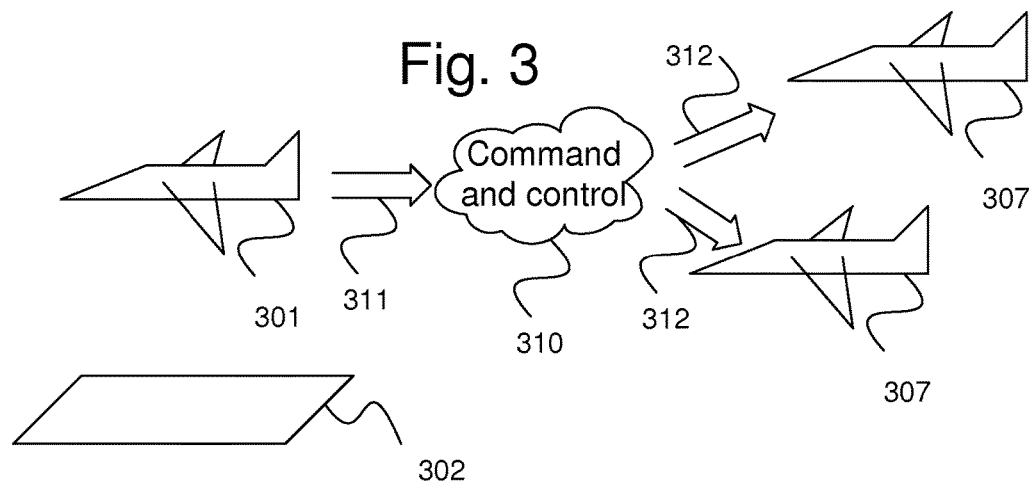
FIG. 3 illustrates schematically a first platform and a second platform in communication with a unit for command and control.

In FIG. 3, a system for mission planning comprises a first platform 301 scanning an interesting area. The first platform is followed by one or a plurality of second platforms 307. The first platform may be in direct communication with the second platform(s) 307. However, in the illustrated example, the first platform 301 communicates data related to the sensor images to a command and control unit 310 via a first communication line 311. The command and control unit 310 processes the data from the first platform 301 and then communicates information to each respective second platform 307 via a second communication line 312 based on the result of the processing in the command and control unit. In one example, the first platform comprises the above described sensor 203, positioning module, map 204 and processing and control unit 205. The processing and control module 205 may then be arranged to communicate to the command and control unit 310 data related to the geo-referenced sensor image potentially including the above described additional information. The command and control unit may in accordance with this example comprise the presentation and/or decision support module 206 and the user input module 209. In one example, wherein the second platforms for example are arranged to fight targets, the command and control unit 310 may comprise personnel selecting targets in the sensor image. The extracted coordinate data related to the selected targets may then be communicated to the second platforms 307 over the second communication line 312. The command and control unit may in another example perform route planning based on the information in the geo-referenced sensor images. The second communication line 312 may in accordance with this example be used for communication of routes planned by the command and control unit 310 to the respective second platforms 312. Alternatively, decisions may be taken at the respective second platforms 307 instead of in the command and control unit 310, as is described in relation to FIG. 2. In one example, the system for mission planning operates in real time. Thus, the processing is performed within tenths of seconds. The delay between the capture of a sensor image in the first platform and the presentation of the processed information in the second platform may be within one second.

Figure 4:
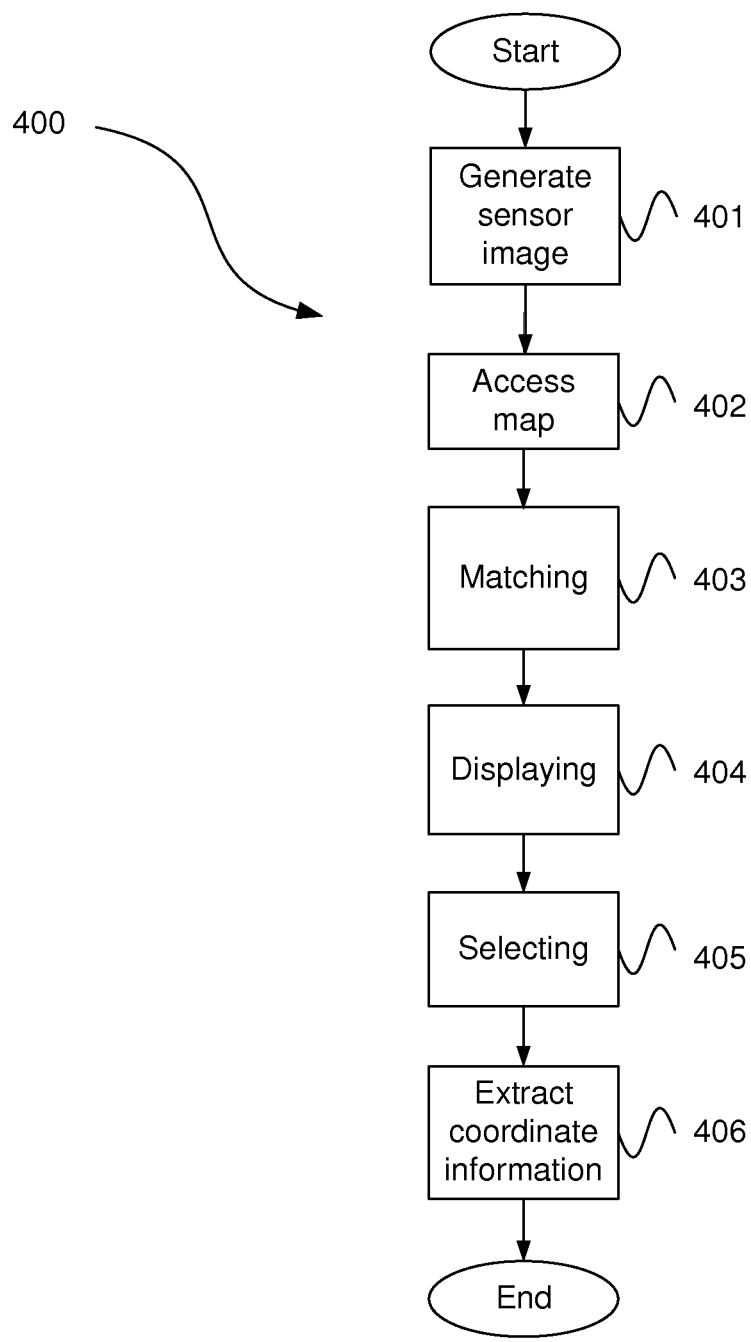
FIG. 4 is a flow chart illustrating an example of a method for determining a relation between a first scene and a second scene.

In FIG. 4, a method 400 for associating geocoded information to an image of a first scene comprises the following steps.

In a first step 401, at least one sensor image of a first scene is generated with at least one sensor.

In a next step 402, information related to at least one second scene is accessed, said second scene encompassing said first scene. This step involves accessing a 3D map comprising geocoded 3D coordinate data. In one example, the 3D map comprises a 3D model of the surrounding environment comprising 3D coordinate data given in a geo-referenced coordinate system. The 3D model may be textured. In detail, this may be performed by associating texture information to at least some of the 3D coordinate data.

Thereafter, the sensor image is matched with the second scene to map the sensor image onto the second scene in a matching step 403. The matching may involve matching texture information of the sensor image with texture information related to the second scene. The mapping involves associating geocoding information to a plurality of positions in the sensor image based on the coordinate data of the second scene.

Thereafter, a step 404 for displaying the sensor image on a display may be performed.

A selection step 405 may be followed for selecting a point or area in the sensor image. In a subsequent step 406, the coordinate information related to the selected point or area in the sensor image may be extracted.

In FIG. 5, a method 500 for determining a relation between a geo-referenced sensor image and map data related to a corresponding area comprises the following steps.

In a first step 507, the geocoded reference image is formed by data from the above described 3D map, wherein the geographical extension of the geocoded reference image corresponds to the geographical extension of the sensor image.

Thereafter a step 508 follows of identifying geocoded additional information from the geocoded sensor image in relation to the corresponding geocoded reference image. The identified geocoded additional information may comprise information relating to addition and/or removal of at least one object in the sensor image in relation to the corresponding geocoded reference image. The identified geocoded additional information may comprise information related to a difference in shape and/or size of at least one object in the sensor image in relation to the corresponding geocoded reference image. The identified geo-referenced additional information may comprise information relating to at least one texture deviation in the sensor image in relation to the corresponding geocoded reference image. The identified additional information may comprise additional geocoded coordinate data providing enhanced resolution in relation to the reference image. The identified geo-referenced additional information may comprise IR information.

The sensor image with the additional information marked in the sensor image may then be displayed in a display step 509. Points/areas of the displayed sensor image can then be selected 510 and coordinate data can be extracted 511 in the manner as described in relation to FIG. 4. In one example, the 3D map may be updated with the additional information in an updating step 512.

A computer programme of the processor 205 (see FIG. 2) comprises a programme code for determining a relation between a first scene and a second scene. The computer programme comprises the steps of
  receiving first data related to at least one sensor image of a first scene from at least one sensor,
  receiving information related to at least one second scene, said second scene encompassing said first scene. This step comprises accessing a 3D map comprising geocoded 3D coordinate, and
  matching the sensor image with the second scene to map the sensor image onto the second scene. This step involves associating geocoding information to a plurality of positions in the sensor image based on the coordinate data of the second scene.

A computer programme product may comprise a programme code stored on a, by a computer readable, media for determining a relation between a first scene and a second scene. The computer programme executes the steps of
  receiving first data related to at least one sensor image of a first scene from at least one sensor,
  receiving information related to at least one second scene, said second scene encompassing said first scene, and
  matching the sensor image with the second scene to map the sensor image onto the second scene, wherein the step of receiving information related to the at least one second scene comprises accessing a 3D map comprising geocoded 3D coordinate data and the mapping involves associating geocoding information to a plurality of positions in the sensor image based on the coordinate data of the second scene, when said computer programme is run on a computer.

The foregoing description of the preferred embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated.

The invention claimed is:

1. Method for determining a relation between a first scene and a second scene, said method comprising the steps of
generating at least one sensor image of a first scene with at least one sensor;
accessing information related to at least one second scene by a processing and control module, said second scene encompassing said first scene; and
matching, by the processing and control module, the sensor image with the second scene to map the sensor image onto the second scene,
wherein:
the step of accessing information related to the at least one second scene comprises:
accessing a textured 3D map comprising geocoded 3D coordinate data by the processing and control module, wherein the textured 3D map comprises a 3D model having texture information associated to one or more surfaces of the 3D model; and
extracting, from the textured 3D map and by the processing and control module, the texture information comprising the corresponding geocoded 3D coordinate data related to the at least one second scene, said extracting generating 2D extracted texture information; and
the step of matching the sensor image with the second scene to map the sensor image onto the second scene comprises:
matching, by the processing and control module, the 2D extracted texture information corresponding to at least one of the one or more surfaces of the 3D model and comprising the corresponding geocoded 3D coordinate data with 2D image texture information of the sensor image, the 2D image texture information of the sensor image corresponding to one or more surfaces within the sensor image, and
associating, by the processing and control module, the extracted corresponding geocoded 3D coordinate data to a plurality of positions in the sensor image based on the matching of the 2D extracted texture information with the 2D image texture information of the sensor image.

2. Method according to claim 1, wherein the 3D map comprises a 3D model of the environment comprising 3D coordinate data given in a geo-referenced coordinate system.

3. Method according to claim 1, further comprising:
displaying the sensor image on a display;
receiving a selection of a point on the displayed image of the sensor image;
extracting coordinate information related to the selected point in the sensor image.

4. Method according to claim 1, further comprising a step of forming a geocoded reference image from the second scene, wherein a geographical extension of the geocoded reference image corresponds to a geographical extension of the sensor image.

5. Method according to claim 4, further comprising a step of identifying geocoded additional information from the geocoded sensor image in relation to the corresponding geocoded reference image.

6. Method according to claim 5, wherein the geocoded additional information comprises information related to a difference in at least one of shape or size of at least one object in the sensor image in relation to the corresponding geocoded reference image.

7. Method according to claim 5, wherein the additional information comprises information relating to at least one texture deviation in the sensor image in relation to the corresponding geocoded reference image.

8. Method according to claim 5, wherein the additional information comprises additional geocoded coordinate data providing enhanced resolution in relation to the reference image.

9. Method according to claim 8, further comprising a step of updating the geocoded reference image based on the additional information.

10. Method according to claim 5, wherein the at least one sensor comprises an IR sensor, and wherein the geocoded additional information comprises IR data.

11. Method according to claim 5, further comprising a step of presenting the geocoded additional information.

12. System for determining a relation between a first scene and a second scene, said system comprising:
at least one sensor configured to capture at least one image of the first scene;
a map comprising geographic information; and
a processing and control module comprising a processor and coupled to a storage medium, wherein the processing and control module accesses from the map information related to at least one second scene, said second scene encompassing said sensor image, and matches the sensor image with the second scene to map the sensor image onto the second scene,
wherein:
the map is a textured 3D map comprising geocoded 3D coordinate data, wherein the textured 3D map comprises a 3D model having texture information associated to one or more surfaces of the 3D model;
the accessing of the map by the processing and control module comprises:
accessing the textured 3D map, and
extracting, from the textured 3D map, the texture information comprising the corresponding geocoded 3D coordinate data related to the at least one second scene, said extracting generating 2D extracted texture information; and
the processing and control module matches the 2D extracted texture information corresponding to at least one of the one or more surfaces of the 3D model and comprising the corresponding geocoded 3D coordinate data with 2D image texture information of the sensor image, the 2D image texture information of the sensor image corresponding to one or more surfaces within the sensor image, and associates the extracted corresponding geocoded 3D coordinate data to a plurality of positions in the sensor image based on the coordinate data of the second scene based on the matching of the 2D extracted texture information with the 2D image texture information of the sensor image.

13. System according to claim 12, wherein the 3D map comprises a 3D model of the environment comprising 3D coordinate data given in a geo-referenced coordinate system.

14. System according to claim 12 further comprising means for extracting coordinate information related to a selected point in the sensor image.

15. System according to claim 14, further comprising a display configured to display the sensor image and selection means for selecting the point from the displayed sensor image.

16. System according to claim 12, wherein the processing and control module is configured to form a geocoded reference image from the second scene, wherein a geographical extension of the geocoded reference image corresponds to the geographical extension of a sensor image.

17. System according to claim 16, wherein the processing and control module further is configured to identify geocoded additional information from the geocoded sensor image in relation to the corresponding geocoded reference image.

18. System according to claim 17, wherein the geocoded additional information comprises information relating to at least one of:
- at least one of addition or removal of at least one object in the sensor image in relation to the corresponding geocoded reference image;
- at least one of a difference in at least one of shape or size of at least one object in the sensor image in relation to the corresponding geocoded reference image; or
- at least one of texture deviation in the sensor image in relation to the corresponding geocoded reference image.

19. System according to claim 17 wherein the additional information comprises additional geocoded coordinate data providing enhanced accuracy in relation to the reference image.

20. System according to claim 19, wherein the 3D map is updated with the additional information based on the geocoded reference image based on the additional information.

21. System according to claim 17, wherein the at least one sensor comprises an IR sensor and in that the processing and control module is configured to providing IR data as geocoded additional information.

22. System according to claim 12, further comprising a presentation unit configured to present information related to the sensor image associated with geocoding information.

23. System according to claim 22, wherein the presentation unit further is configured to present information related to the geocoded reference image.

24. System according to claim 22, wherein the presentation unit further is configured to present information related to the geocoded additional information.

25. System according to claim 22, further comprising:
- a first platform comprising at least the at least one sensor and a first communication unit for transmittal of at least first data related to the captured at least one image of the first scene; and
- a second platform comprising at least the presentation unit and a second communication unit for reception of at least second data related to the sensor image associated with geocoding information.

26. A computer program product for determining a relation between a first scene and a second scene, the computer program product comprising at least one non-transitory computer-readable storage medium having computer-readable program code portions stored therein, the computer-readable program code portions comprising:
an executable portion configured for receiving first data related to at least one sensor image of a first scene from at least one sensor;
an executable portion configured for receiving information related to at least one second scene, said second scene encompassing said first scene; and
an executable portion configured for matching the sensor image with the second scene to map the sensor image onto the second scene,
wherein:
the receiving of information related to the at least one second scene comprises:
accessing a textured 3D map comprising geocoded 3D coordinate data, wherein the textured 3D map comprises a 3D model having texture information associated to one or more surfaces of the 3D model; and
extracting, from the textured 3D map, the texture information comprising the corresponding geocoded 3D coordinate data related to the at least one second scene, said extracting generating 2D extracted texture information; and
the step of matching the sensor image with the second scene to map the sensor image onto the second scene comprises:
matching the 2D extracted texture information corresponding to at least one of the one or more surfaces of the 3D model and comprising the corresponding geocoded 3D coordinate data with 2D image texture information of the sensor image, the 2D image texture information of the sensor image corresponding to one or more surfaces within the sensor image, and
associating the extracted corresponding geocoded 3D coordinate data to a plurality of positions in the sensor image based on the matching of the 2D extracted texture information with the 2D image texture information of the sensor image.

27. Method according to claim 1, wherein the matching of the extracted texture information comprises directly matching the extracted texture information with the sensor image.

28. Method according to claim 1, wherein the sensor image generated is unaltered during the matching process.

29. Method according to claim 1, wherein the method further comprises the steps of:
identifying geocoded additional information from the sensor image in relation to the corresponding reference image, the geocoded additional information comprising changes in a portion of the 3D map; and
updating the 3D map based on the identified geocoded additional information.

30. Method according to claim 1, wherein the texture information includes height data.

31. System according to claim 17, wherein the processing and control module is further configured to:
identify geocoded additional information from the sensor image in relation to the corresponding reference image, the geocoded additional information comprising changes in a portion of the 3D map; and
update the 3D map based on the identified geocoded additional information.

32. Method according to claim 1, wherein the first scene is captured from a first point of reference and the second scene is captured from a second point of reference different from the first point of reference.

33. System according to claim 12, wherein the first scene is captured from a first point of reference and the second scene is captured from a second point of reference different from the first point of reference.

\* \* \* \* \*